US008378612B2

(12) United States Patent
Wu

(10) Patent No.: US 8,378,612 B2
(45) Date of Patent: Feb. 19, 2013

(54) CONTROL SYSTEM AND METHOD OF OPERATING A MASSAGE DEVICE

(76) Inventor: Chichun Wu, Dongguan (CN)

( * ) Notice: Subject to any disclaimer, the term of this patent is extended or adjusted under 35 U.S.C. 154(b) by 141 days.

(21) Appl. No.: 12/966,339

(22) Filed: Dec. 13, 2010

(65) Prior Publication Data

US 2011/0144549 A1 Jun. 16, 2011

Related U.S. Application Data

(63) Continuation of application No. 11/995,060, filed on Jan. 8, 2008, now Pat. No. 7,880,420.

(51) Int. Cl.
*G05B 19/10* (2006.01)

(52) U.S. Cl. ........ 318/567; 318/799; 318/603; 318/599; 318/685; 318/113; 601/57; 601/100; 601/84; 601/49; 601/86; 700/46

(58) Field of Classification Search .................. 318/799, 318/603, 567, 599, 685, 102, 701, 696; 601/57, 601/100, 84, 112, 134, 98, 101, 97, 87, 70, 601/49, 103, 115, 116, 126, 127, 90, 91, 601/92, 93, 94, 99, 113, 133, 135, 136
See application file for complete search history.

(56) References Cited

U.S. PATENT DOCUMENTS 6,077,238 A * 6/2000 Chung ............................ 601/57
6,171,266 B1 * 1/2001 Inada et al. ..................... 601/99
6,744,370 B1 * 6/2004 Sleichter et al. .............. 340/576
2002/0068887 A1 * 6/2002 Kikumoto et al. .............. 601/49
2004/0225239 A1 * 11/2004 Yamamoto et al. ............. 601/84
2005/0245851 A1 * 11/2005 Ferber et al. ..................... 601/86
2006/0217643 A1 * 9/2006 Yonekawa et al. ............ 601/148

* cited by examiner

*Primary Examiner* — Lincoln Donovan
*Assistant Examiner* — Jorge Carrasquillo
(74) *Attorney, Agent, or Firm* — Morris Manning & Martin LLP; Tim Tinkang Xia, Esq.

(57) ABSTRACT

A control system for a massage device. The massage device has a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged. In one embodiment, the control system includes: an on-off switch for a user to activate or deactivate the massage device; a mode selector for a user to select one of a plurality of operating modes, wherein the plurality of operating modes includes at least two of (i) full range massage, (ii) shoulder area massage, (iii) upper back massage, (iv) lower back massage, (v) waist area massage, and (vi) any combination of (ii), (iii), (iv) and (v); and a motor controller configured to start the motor in response to the user's activating the on-off switch to drive the plurality of kneading heads and to drive the carriage up and down relative to the base in a range according to the operating mode selected by the user.

17 Claims, 7 Drawing Sheets

CONTROL SYSTEM AND METHOD OF OPERATING A MASSAGE DEVICE

CROSS-REFERENCE TO RELATED PATENT APPLICATION

This application is a continuation application of U.S. patent application Ser. No. 11/995,060, filed on Jan. 8, 2008, entitled "CONTROL SYSTEM AND METHOD OF MASSAGE MACHINE," by Chichun Wu, which is allowed and is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference were individually incorporated by reference.

FIELD OF THE INVENTION

The present invention relates to a control system for a massage device, more particularly, to a control system for a massage device that can massage various areas of a body of a user.

BACKGROUND OF THE INVENTION

Chinese patent No. 02127013.9 (Publication No. CN1399946A) discloses "a massage machine control method", in which rotary motion applied to a drive motor enables a massage head to vibrate and thus to knock a certain massage area. A drive signal, which repeatedly initiates and stops within a specified time, is conducted to the motor to make it activate intermittently. That is, in order to effectively use the massage head mounted on the massage machine for kneading and stretching dorsal muscles, control mechanism and control circuit is used to achieve knocking motion imitating manual-massage feelings in a simple method. Specifically, the massage machine, the massage head of which vibrates continuously when inputting a continuation of proper voltage, sets the voltage inputted into pulse-shape and repeatedly proceeds such operation within given on-off time, thus making motor operate intermittently, thereby enabling the massage head to perform comfortably knocking motion. More specifically, the first step is to operate switch class of a set portion and to set frequency and duty factor or to set pulse actuation position and phase angle relative to commercial power. Then enter the setting into a calculation portion and subsequently output to a power control portion after calculating. The voltage commuted by a power portion is applied to the knocking motor. As the calculation portion is outputted, transistors and field-effect transistors (FET) of the power control portion make the power on or off, and put pulse voltage into the knocking motor or put voltage of the power portion into the knocking motor. As the calculation portion outputs, three-terminal bidirectional switch and two-end switch component make current flow turned on or cut off. A part of the sine wave of the commercial power which is cut off by the knocking motor is assigned to the pulse-shape voltage. Add pulse signal A of drive method mentioned above to pulse signal B and vary width of the pulse signal B. Accordingly, sine wave or pulse signal B whose frequency is higher than the pulse signal A is generated and output pulse signal which is able to obtain theoretical product of the pulse signal A is produced. Then change duty factor of the sine wave or the pulse signal B to output pulse signal to excite the knocking motor. By a method of PWM (pulse width modulation) mechanism, if duty factor of the pulse signal B is changed, effective value of the voltage relative with the motor will change. In fact, it is able to achieve similar effect of making voltage changed. That is, intensity of knocking could be changed. However, some drawbacks also exist as follows. First, it is not able to randomly control to reselect one operation mode during full routine, upper half-routine, lower half-routine or DEMO is performing, thus it is less convenient to use. Second, using the kneading massage head to knock is realized by increasing simple knocking-motion structure and simple procedure. Because of bringing constant vibrating stimulation, a problem of use feeling significantly worse than manual massage feelings also exists.

Chinese Patent No. 200420117353.1, entitled "a massage machine structure", which is obtained by the present applicant earlier, provides a massage head and a drive device thereof, which could operate various kinds of massage motions.

Therefore, a heretofore unaddressed need exists in the art to address the aforementioned deficiencies and inadequacies.

SUMMARY OF THE INVENTION

Accordingly, an object of the present invention is to provide a control system and a control method of a massage machine which could randomly control to reselect one operation mode during full routine, upper half-routine, lower half-routine or DEMO is performing to overcome drawbacks in the prior art mentioned above.

To achieve the above-mentioned object, the present invention provides a massage control method of an electrical massage machine which includes a Single Chip Microcomputer (SCM) controller, multiple massage heads, a common motor, routine keys, and multiple sets of upper and lower motor switches corresponding to the routine keys. The massage control method comprises steps of:

1.1) setting current upper and lower motor switches according to the current routine key that a user has selected to start a routine, and actuating a timer to count;

1.2) judging whether the value of the timer is within time of the routine or not, if YES, controlling the motor to rotate forward until reaching the current upper motor switch, if NO, going to step 1.4);

1.3) judging whether the value of the timer is within time of the routine or not, if YES, controlling the motor to rotate backward until reaching the current lower motor switch and then returning to step 1.2), if NO, going to the next step; 1.4) ending the routine;

wherein the method further comprises a step between step 1.1) and step 1.4): the user reselects one routine key and then returning to step 1.1).

According to an embodiment of the control method, the routine time is 15 minutes.

According to another embodiment of the control method, the number of the upper and lower motor switches is five, and the routines include shoulder routine, upper back routine, lower back routine and waist routine.

According to still another embodiment of the control method, the routines include full routine, upper half-routine, and lower half-routine.

According to an embodiment of the control method, the SCM control program performs steps of:

(1) switching on and initializing a program, that is, setting all port parameters of the Single Chip Microcomputer controller and set registers;

(2) performing watchdog program;

(3) judging a time of 10 millisecond, that is, judging whether a 10 millisecond flag exists or not, if YES, going to the next step, if No, going to step (5);

(4) calling timing and cumulating subprogram to finish carriage direction changing and to realize motor ceasing for 1 second cumulation, LED lamp glittering for 0.5 second cumulation and routine performing for 15 minutes cumulation;

(5) judging a time of 1 millisecond, that is, judging whether a 1 millisecond flag exists or not, if YES, going to the next step, if No, going to step (7);

(6) calling key and LED lamp scanning subprogram to obtain a routine key selected by a user on-line;

(7) judging a time of 250 millisecond, that is, judging whether a 250 millisecond flag exists or not, if YES, going to the next step, if No, going to step (9);

(8) calling routine-switch scanning subprogram to obtain a routine key selected by the user on-line;

(9) judging a time of 3 millisecond, that is, judging whether a 3 millisecond flag exists or not, if YES, going to the next step, if No, going to step (11);

(10) calling motor rolling and kneading control subprogram to control the motor to rotate forward until reaching the current upper motor switch or to control the motor to rotate backward until reaching the current lower motor switch;

(11) judging whether the carriage has been reset: if NO, going to the next step, if YES, going to step (2);

(12) calling carriage resetting subprogram to prepare for the next motor rolling and kneading control;

A control system of a massage machine comprises:

a common drive motor, the common drive motor driving a transmission mechanism to control multiple massage heads of various working ranges to perform imitated massage motion;

a plurality of routine keys used for setting current upper and lower motor switches;

motor switches regulating the various working ranges of the motor; and a Single Chip Microcomputer controller, the Single Chip Microcomputer controller controlling the motor to rotate in the working ranges regulated by the motor switches and keeping receiving routine key signal generated when a user selects one routine key to adjust the current upper and the current lower motor switches during the routine is performing.

According to an embodiment of the control system, the number of the motor switches is five, and the routine keys comprise a shoulder routine key, an upper back routine key, a lower back routine key and a waist routine key.

According to another embodiment of the control system, the routine keys include full routine key, upper half-routine key, and lower half-routine key.

According to still another embodiment of the control system, the control system comprises a control box and a massage cushion. The Single Chip Microcomputer controller is disposed on a circuit board in the control box. The routine keys are formed on an outer surface of the control box. The motor and the motor switches are disposed in the massage cushion, and the control box is connected with the massage cushion by connection cables.

In comparison with the prior art, the present invention has advantages as follows:

1) The circuit part is simple and low-cost.

2) Only common electronic elements are needed.

3) The program is reasonable and practical.

4) The simulation effect is sound.

It is able to change the routine during the routine is performing, thus catering to user's need of changing at any moment.

The present invention, in one aspect, relates to a method of operating a massage device. The massage device has a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged. In one embodiment, the method includes the steps of: (a) setting the massage device in one of a plurality of operating modes in response to a user's selection, wherein the plurality of operating modes includes at least two of (i) full range massage, (ii) shoulder area massage, (iii) upper back massage, (iv) lower back massage, (v) waist area massage, and (vi) any combination of (ii), (iii), (iv) and (v); and (b) starting the motor in response to the user's activating an on-off switch to drive the plurality of kneading heads and to drive the carriage up and down relative to the base in a range according to the operating mode selected by the user.

In one embodiment, the method further includes the step of, after the starting step, stopping the motor in response to the user's deactivating the on-off switch.

In one embodiment, the method further includes the step of, after the stopping step, returning the carriage to a default position.

In another embodiment, the method further includes the steps of: (a) before the starting step, setting a timer for a time interval in response to the user's input; (b) concurrent to the starting step, starting the timer to count down from the time interval; and (c) after the starting step, stopping the motor when the timer counts down to zero. In one embodiment, the time interval ranges from about 5 minutes to about 45 minutes, preferably 15 minutes.

In yet another embodiment, the method further includes the steps of, after the starting step, repeating the setting step if the user has reselected a new operating mode that is different from the operating mode previously selected by the user, and operating the motor to drive the carriage up and down relative to the base in a range according to the new operating mode.

In a further embodiment, the plurality of operating modes further includes a demonstration mode.

In another aspect, the present invention relates to a control system for a massage device. The massage device has a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged. In one embodiment, the control system includes: (a) an on-off switch for a user to activate or deactivate the massage device; (b) a mode selector for a user to select one of a plurality of operating modes, wherein the plurality of operating modes includes at least two of (i) full range massage, (ii) shoulder area massage, (iii) upper back massage, (iv) lower back massage, (v) waist area massage, and (vi) any combination of (ii), (iii), (iv) and (v); and (c) a motor controller configured to start the motor in response to the user's activating the on-off switch to drive the plurality of kneading heads and to drive the carriage up and down relative to the base in a range according to the operating mode selected by the user.

In one embodiment, the control system further includes a timer configured to receive an input from the user, set a time interval according to the user's input, and start counting down from the time interval when the motor controller starts the motor.

In another embodiment, the motor controller is further configured to, after starting the motor, stop the motor in response to the user's deactivating the on-off switch or when the timer counts down to zero.

In yet another embodiment, the motor controller is further configured to, after stopping the motor, return the carriage to a default position.

In a further embodiment, the motor controller has a plurality of relay switches, wherein each of the plurality of relay switches corresponds to a respective operating mode and is activated when the corresponding operating mode is selected.

In a further aspect, the present invention relates to a method of operating a massage device. The massage device has a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged. In one embodiment, the method includes the steps of: (a) setting the massage device in one of a plurality of operating modes in response to a user's selection, wherein the plurality of operating modes includes at least two of (i) full range massage, (ii) upper portion massage, (iii) lower portion massage, and (iv) demonstration mode; and (b) starting the motor in response to the user's activating an on-off switch to drive the plurality of kneading heads and to drive the carriage up and down relative to the base in a range according to the operating mode selected by the user.

In one embodiment, the upper portion massage includes shoulder and upper back massage, and the lower portion massage includes lower back and waist massage.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numerals are used throughout the drawings to refer to the same or like elements of an embodiment, and wherein.

DETAILED DESCRIPTION OF THE INVENTION

Figure 1:
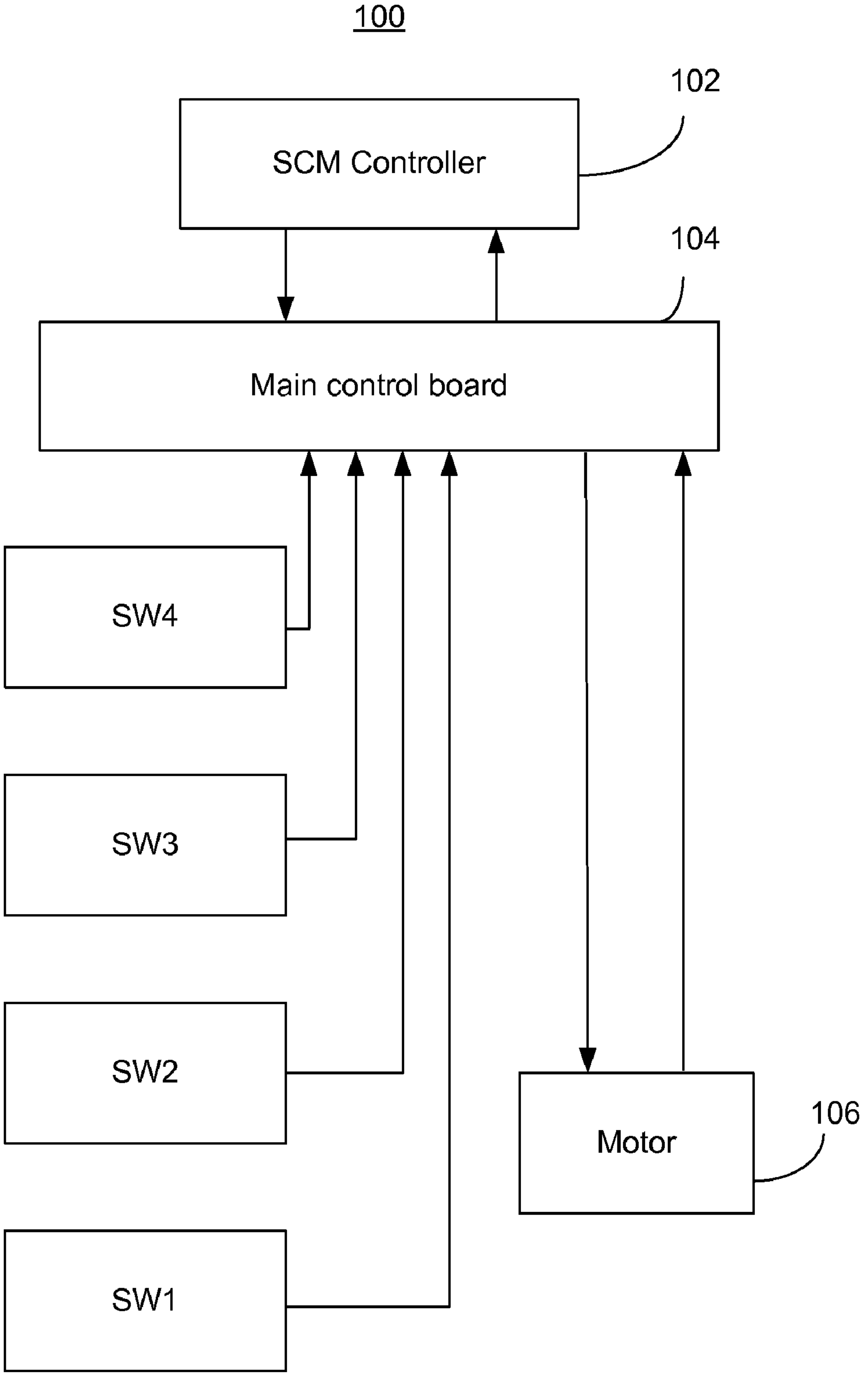
FIG. 1 shows a schematic diagram of a control system for a massage device according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

Embodiments of the present invention will be described in conjunction with the accompanying drawings in FIGS. 1-7. In accordance with the purposes of this invention, as embodied and broadly described herein, this invention, in one aspect, relates to a control system for a massage device. As shown in FIG. 7, the massage device 700 has a base 710, a carriage 720 movably engaged with the base 710, a plurality of kneading heads 730 mounted on the carriage 720, and a motor 740 operative to drive the plurality of kneading heads 730 to produce a kneading effect on a body of a user and to drive the carriage 720 up and down relative to the base 710 such that various areas of the body can be massaged. FIG. 1 shows a schematic diagram of a control system 100 for the massage device according to one embodiment of the present invention. The control system 100 includes, among other things, a single chip microcomputer (SCM) controller 102, a main control board 104, and position zone switches SW1, SW2, SW3, and SW4 connected to the main control board 102. The SCM controller 102, the main control board 104, and the zone switches are disposed in a control box. The main control board is coupled to the motor 106 via connection cables, thus enabling the operation of the motor 106 to drive the plurality of kneading heads of the massage device. The position zone switches SW1, SW2, SW3, and SW4 correspond to four different massage modes. In one embodiment, the massage modes include, for example and without limitation, shoulder massage, upper back massage, lower back massage, waist massage, and any combination thereof. In other embodiments, there may be less than or more than four position zone switches, such as two, three, five, or six position zone switches.

Figure 2:
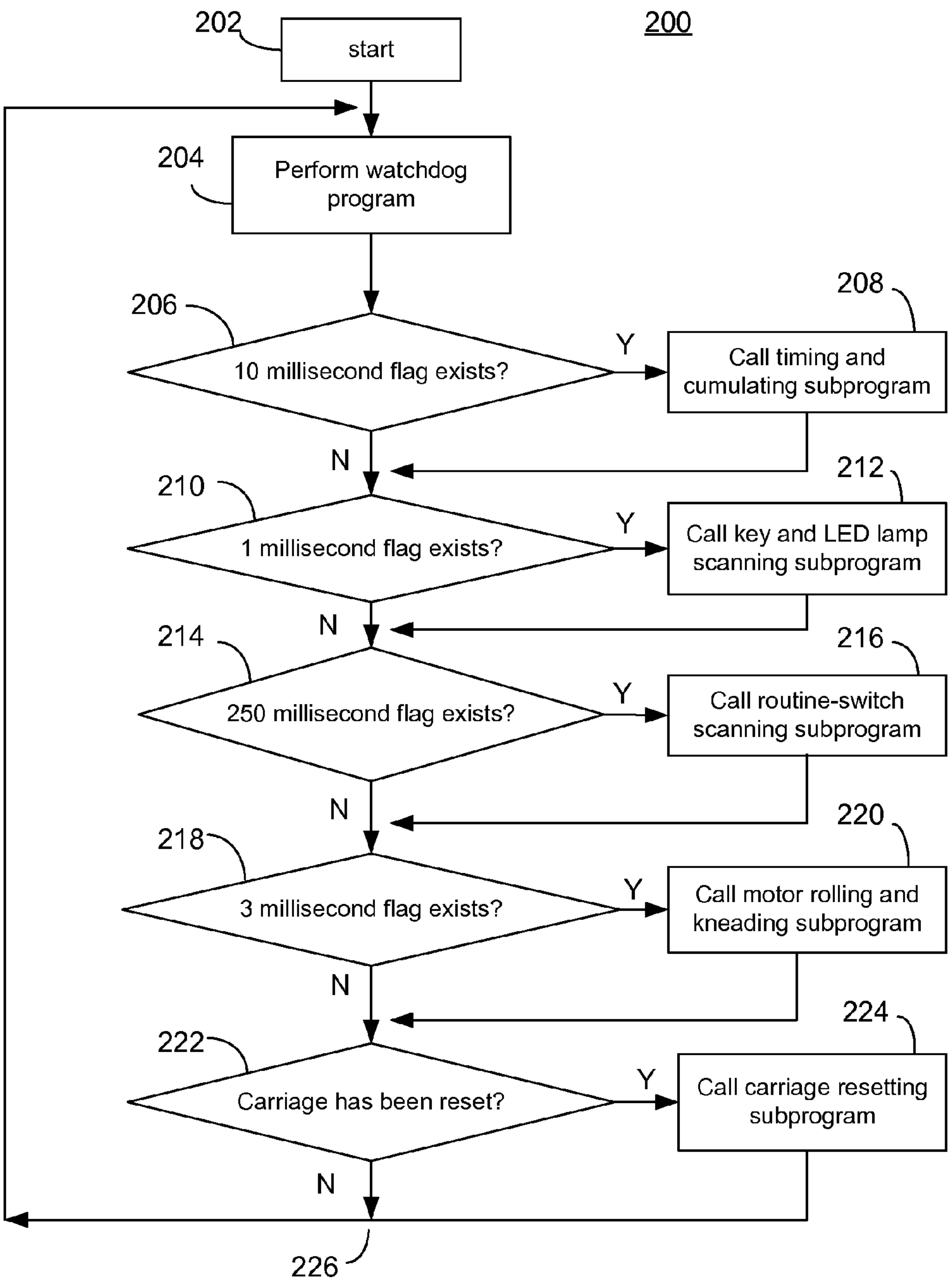
FIG. 2 shows a flow chart of a main program of the single chip microcomputer (SCM) control software according to one embodiment of the present invention.

FIG. 2 shows a flow chart of a main program of an SCM control software according to one embodiment of the present invention. The program includes the steps of:

(a) at step 202, switching on and initializing a program, that is, setting all port parameters of the Single Chip Microcomputer controller and setting registers;

(b) at step 204, performing watchdog program;

(c) at step 206, judging a time of 10 millisecond, that is, judging whether a 10 millisecond flag exists or not, if YES, going to step 208, if No, going to step 210;

(d) at step 208, calling timing and cumulating subprogram to finish carriage direction changing and to realize motor ceasing for 1 second cumulation, LED lamp glittering for 0.5 second cumulation and routine performing for minutes cumulation, then going to step 210;

(e) at step 210, judging a time of 1 millisecond, that is, judging whether a 1 millisecond flag exists or not, if YES, going to step 212, if No, going to step 214;

(f) at step 212, calling key and LED lamp scanning subprogram to obtain a routine key selected by a user online, then going to step 214;

(g) at step 214, judging a time of 250 millisecond, that is, judging whether a 250 millisecond flag exists or not, if YES, going to step 216, if No, going to step 218;

(h) at step 216, calling routine-switch scanning subprogram to obtain a routine key selected by the user on-line, then going to step 218;

(i) at step 218, judging a time of 3 millisecond, that is, judging whether a 3 millisecond flag exists or not, if YES, going to step 220, if No, going to step 222;

(j) at step 220, calling motor rolling and kneading control subprogram to control the motor to rotate forward until reaching the current upper motor switch or to control the motor to rotate backward until reaching the current lower motor switch, then going to step 222;

(k) at step 222, judging whether the carriage has been reset: if YES, going to step 224, if No, going to step 226;

(l) at step 224, calling carriage resetting subprogram to prepare for the next motor rolling and kneading control, then going to step 226; and (m) at step 226, clearing a T-1S register and making a T-60S register self-added, and judging whether the value of the T-60S register is just-on-point equivalent to, if YES, ending the routine and returning to step 204, if No, going to the step 204 directly.

Figure 3:
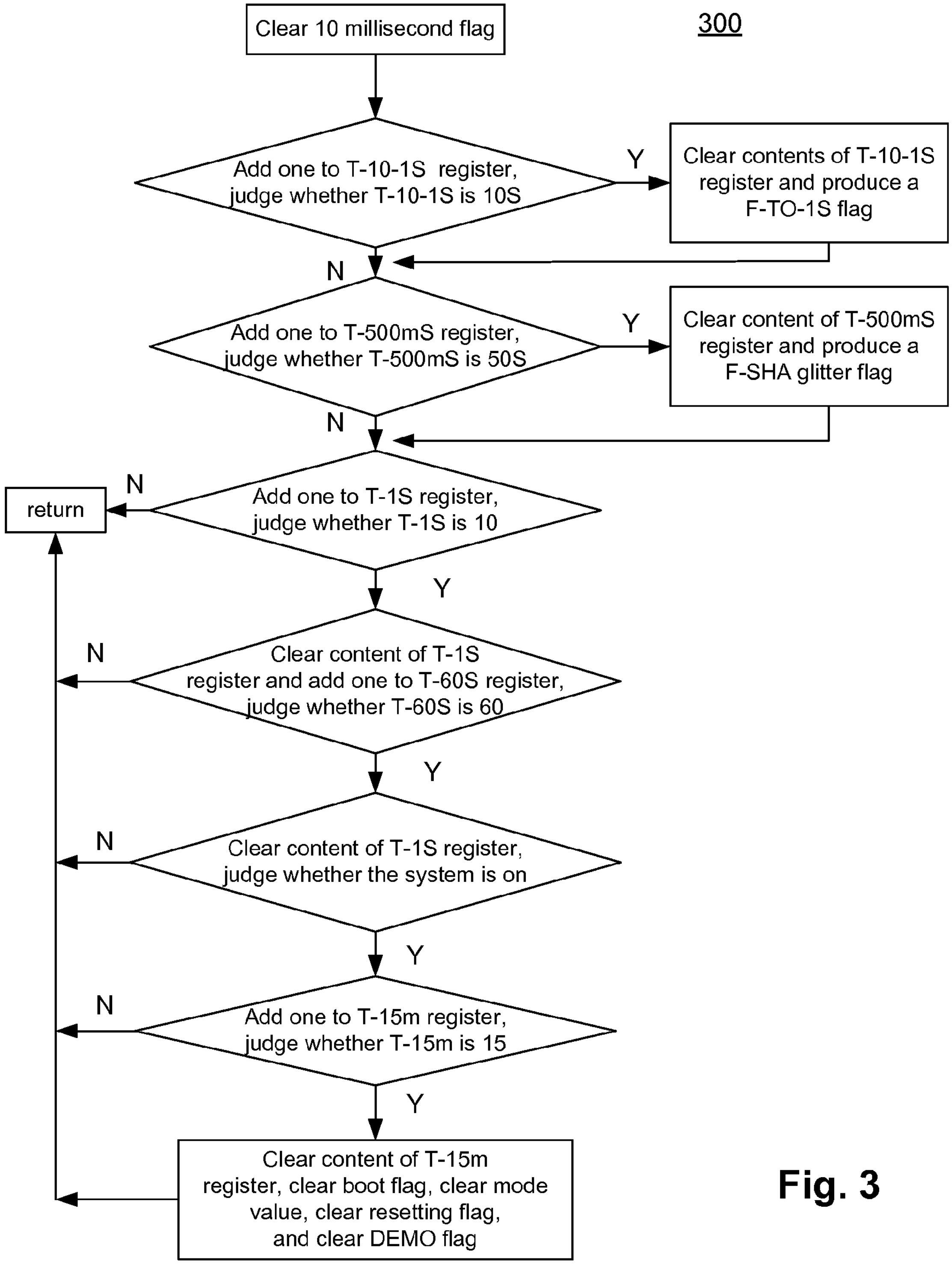
FIG. 3 shows a flow chart of a timing and cumulating subprogram of the main program shown in FIG. 2 according to one embodiment of the present invention.

FIG. 3 shows a flow chart of a timing and cumulating subprogram 300 of the main program 200 according to one embodiment of the present invention.

Figure 4:
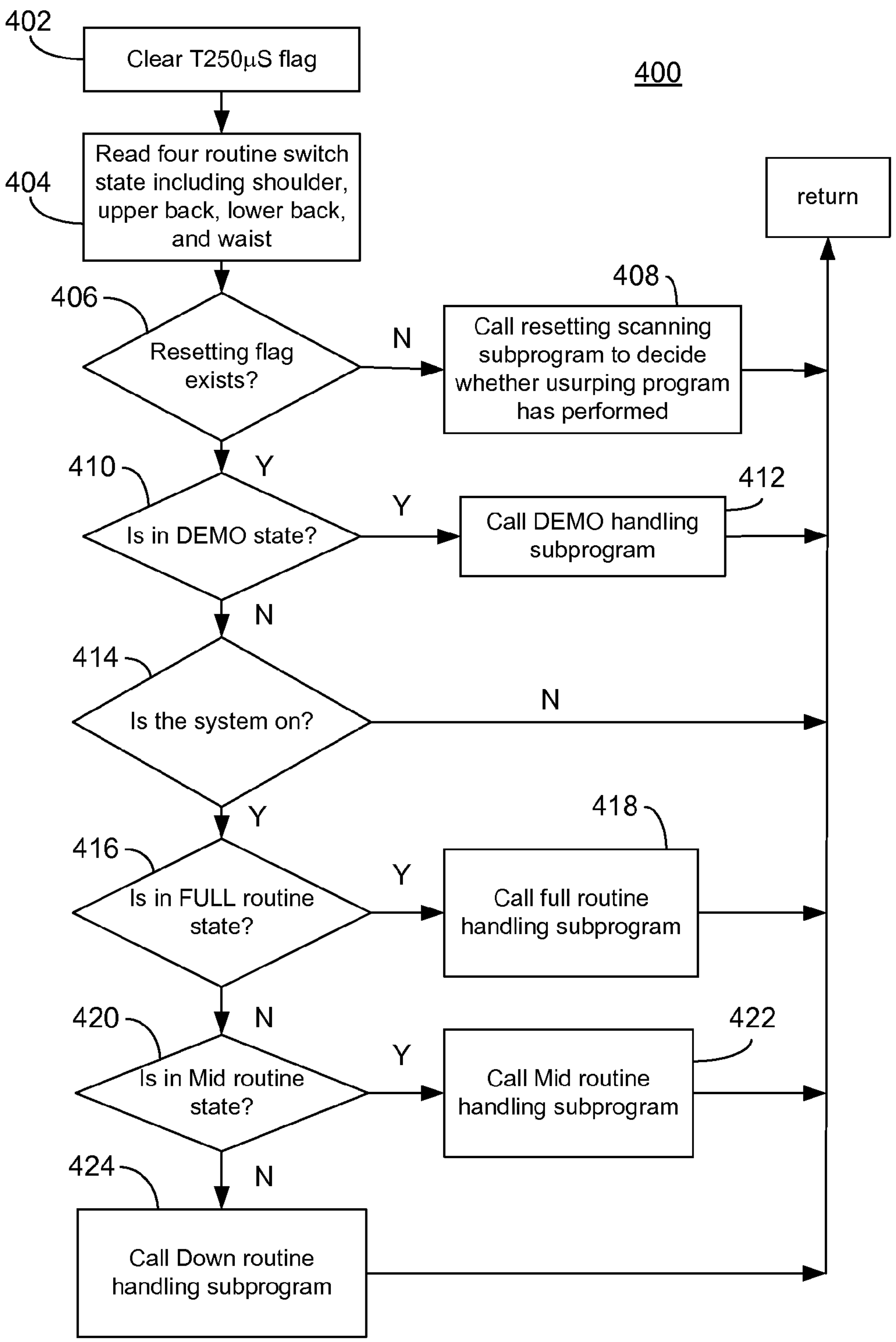
FIG. 4 shows a flow chart of a routine switch scanning subprogram of the main program shown in FIG. 2 according to one embodiment of the present invention.

FIG. 4 shows a flow chart of a routine switch scanning subprogram 400 of the main program 200 according to one embodiment of the present invention. The routine switch scanning subprogram 400 calls a corresponding handling subprogram once detecting that a corresponding routine key is touched. The routine switching scanning subprogram 400 includes the steps of:

(a) at step 402, clearing a T250 μS flag;

(b) at step 404, reading the state of each of the four routine switches, including the switches corresponding to the shoulder, the upper back, the lower back, and the waist;

(c) at step 406, checking if the resetting flag exists: if YES, going to step 410, if NO, going to step 408;

(d) at step 408, calling resetting scanning subprogram to decide whether the usurping program has performed, then returning to the main program;

(e) at step 410, checking if the system is in DEMO state: if YES, going to step 412, if NO, going to step 414;

(f) at step 412, calling the DEMO handling subprogram, then returning to the main program;

(g) at step 414, checking if the system is on: if YES, going to step 416, if NO, returning to the main program;

(h) at step 416, checking if the system is in FULL routine state: if YES, going to step 418, if NO, going to step 420;

(i) at step 418, calling the full routine handling subprogram, then returning to the main program;

(j) at step 420, checking if the system is in Mid routine state: if YES, going to step 422, if NO, going to step 424;

(k) at step 422, calling the Mid routine handling subprogram, then returning to the main program; and (l) at step 424, calling the Down routine handling subprogram, then returning to the main program.

Figure 5:
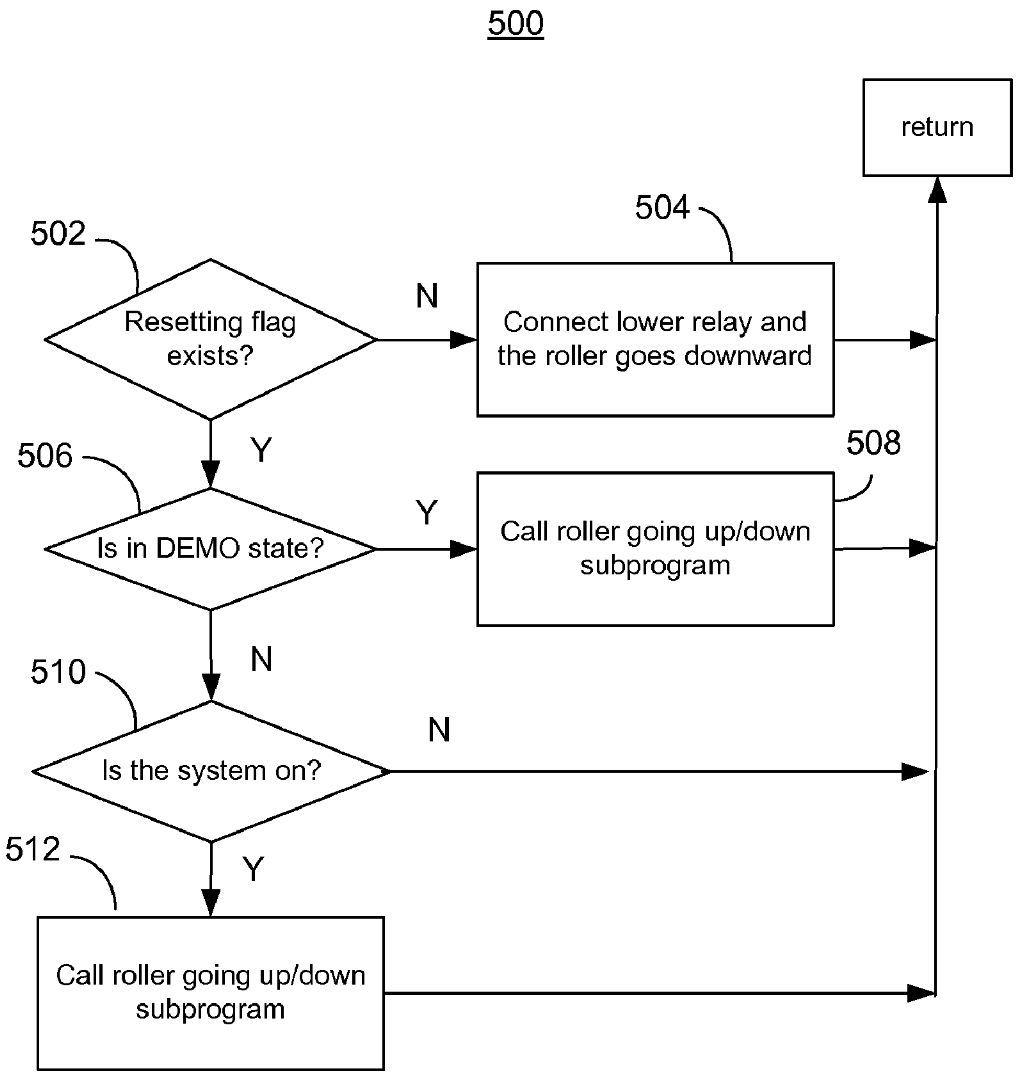
FIG. 5 shows a flow chart of a rolling and kneading control subprogram of the main program shown in FIG. 2 according to one embodiment of the present invention.

FIG. 5 shows a flow chart of a rolling and kneading control subprogram 500 of the main program 200 according to one embodiment of the present invention. The rolling and kneading control subprogram 500 includes the steps of:

(a) at step 502, checking if resetting flag exists: if YES, going to step 506, if NO, going to step 504;

(b) at step 504, connecting the lower relay so that the roller goes downward, then returning to the main program;

(c) at step 506, checking if the system is in DEMO state: is YES, going to step 508, if NO, going to step 510;

(d) at step 508, calling the roller going up/down subprogram, then returning to the main program;

(e) at step 510, checking if the system is on: if YES, going to step 512, if NO, returning to the main program; and (f) at step 512, calling the roller going up/down subprogram, then returning to the main program.

Figure 6:
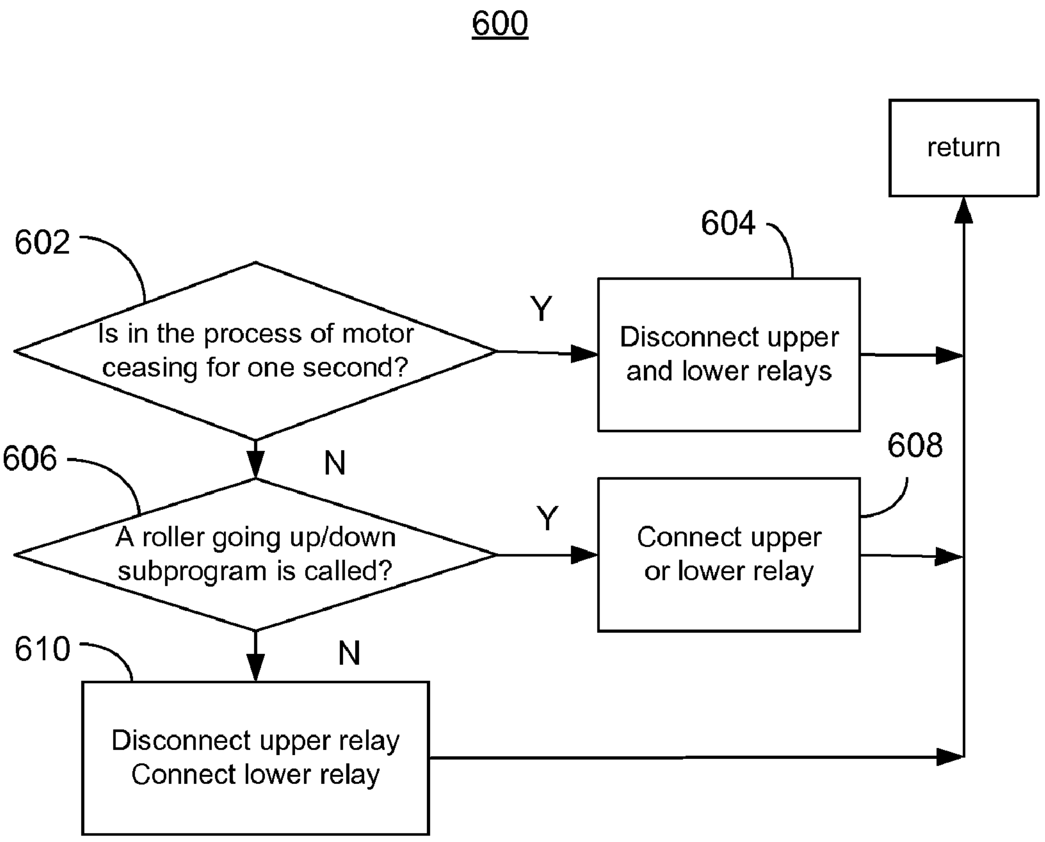
FIG. 6 shows a flow chart of a roller going up and/or down subprogram of the subprogram shown in FIG. 5 according to one embodiment of the present invention.
Figure 7:
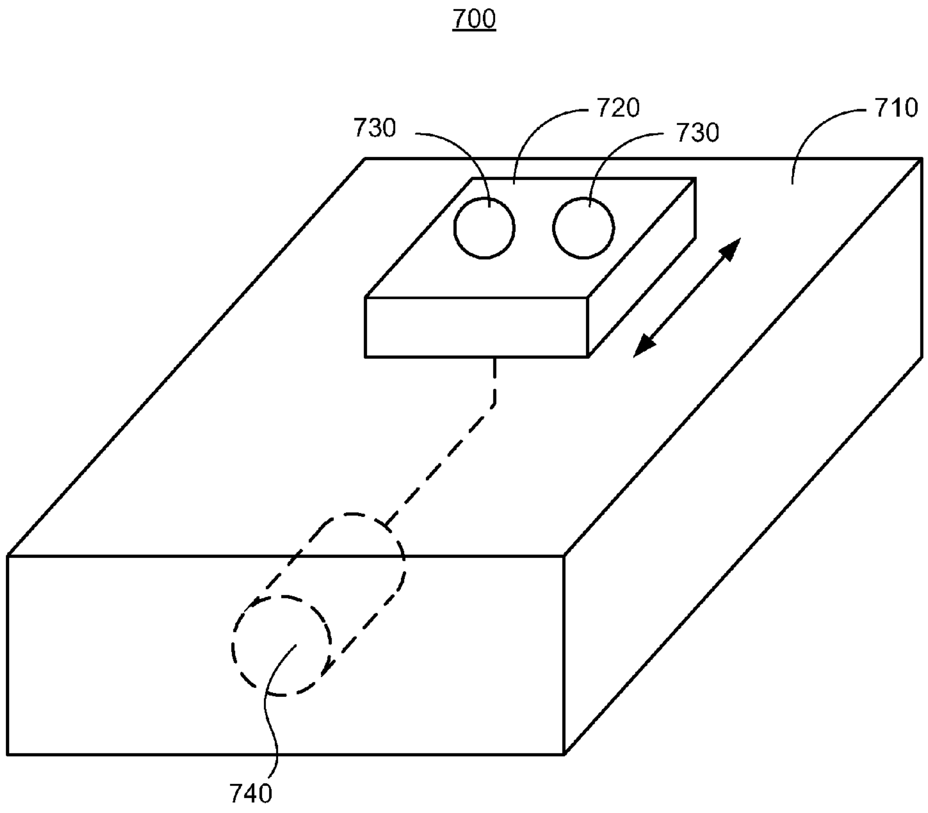
FIG. 7 shows schematically a diagram of a massage device according to one embodiment of the present invention.

FIG. 6 shows a flow chart of a roller going up/down subprogram 600 of the subprogram 500 shown in FIG. 5 according to one embodiment of the present invention. The roller going up/down subprogram 600 includes the steps of:

(a) at step 602, checking if the system is in the process of motor ceasing for one second: if YES, going to step 604, if NO, going to step 606;

(b) at step 604, disconnecting the upper and lower relays, then returning to the main program;

(c) at step 606, checking if a roller going up/down subprogram is called: if YES, going to step 608, if NO, going to step 610;

(d) at step 608, connecting the upper or lower replay, then returning to the main program; and (e) at step 610, disconnecting the upper relay, connecting the lower replay, then returning to the main program.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method of operating a massage device, the massage device having a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged, the method comprising the steps of:

(a) setting the massage device in one of a plurality of operating modes in response to a user's selection, the plurality of operating modes includes at least two of:

(i) full range massage;

(ii) shoulder area massage;

(iii) upper back massage;

(iv) lower back massage;

(v) waist area massage; and (vi) any combination of (ii), (iii), (iv) and (v);

(b) starting the motor by a motor controller in response to the user's activating an on-off switch to drive the plurality of kneading heads and to drive the carriage up and down relative to the base in a range according to the operating mode selected by the user;

(c) stopping the motor in response to the user's deactivating the on-off switch; and (d) returning the carriage to a default position;

wherein the motor controller is configured to execute a routine, the routine comprising:

(1) switching on and initializing a program, and setting all port parameters of the motor controller and set registers;

(2) executing a watchdog program;

(3) if a 10 millisecond flag exists, executing a timing and cumulating subprogram to finish carriage direction changing and to realize motor ceasing for 1 second cumulation, LED lamp glittering for 0.5 second cumulation and routine performing for 15 minutes cumulation;

(4) if the 10 millisecond flag does not exist, and if a 1 millisecond flag exists, executing a key and LED lamp scanning subprogram to obtain a routine key selected by a user on-line;

(5) if the 10 millisecond flag and the 1 millisecond flag do not exist, and if a 250 millisecond flag exists, executing a routine-switch scanning subprogram to obtain a routine key selected by the user on-line;

(6) if the 10 millisecond flag, the 1 millisecond flag and the 250 millisecond flag do not exist, and if a 3 millisecond flag exists, executing a motor rolling and kneading control subprogram to control the motor to rotate forward until the state of the current upper motor switch is changed or to control the motor to rotate backward until the state of the current lower motor switch is changed;

(7) if the 10 millisecond flag, the 1 millisecond flag, the 250 millisecond flag and the 3 millisecond flag do not exist, and the carriage is returned to the default position, executing a carriage resetting subprogram to prepare for the next motor rolling and kneading control; and (8) if the 10 millisecond flag, the 1 millisecond flag, the 250 millisecond flag and the 3 millisecond flag do not exist, and the carriage is not returned to the default position, clearing a T-1S register and adding one to a value of a T-60S register; and (9) ending the routine and returning to the step (1) if the value of the T-60S register equals to 60, and returning to the step (1) directly if the value of the T-60S register does not equal to 60.

2. The method of claim 1 further comprising the steps of:

(a) before the starting step, setting a timer for a time interval in response to the user's input;

(b) concurrent to the starting step, starting the timer to count down from the time interval; and (c) after the starting step, stopping the motor when the timer counts down to zero.

3. The method of claim 2 further comprising the step of, after stopping the motor when the timer counts down to zero, returning the carriage to a default position.

4. The method of claim 2, wherein the time interval ranges from about 5 minutes to about 45 minutes.

5. The method of claim 4, wherein the time interval is about 15 minutes.

6. The method of claim 1 further comprising the steps of, after the starting step, repeating the setting step if the user has reselected a new operating mode that is different from the operating mode previously selected by the user, and operating the motor to drive the carriage up and down relative to the base in a range according to the new operating mode.

7. The method of claim 1, wherein the plurality of operating modes further includes a demonstration mode.

8. A control system for a massage device, the massage device having a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged, the control system comprising:

(a) an on-off switch for a user to activate or deactivate the massage device;

(b) a mode selector for a user to select one of a plurality of operating modes, the plurality of operating modes includes at least two of:

(i) full range massage;

(ii) shoulder area massage;

(iii) upper back massage;

(iv) lower back massage;

(v) waist area massage; and (vi) any combination of (ii), (iii), (iv) and (v); and (c) a motor controller configured to start the motor in response to the user's activating the on-off switch to drive the plurality of kneading heads and to drive the carriage up and down relative to the base in a range according to the operating mode selected by the user, to stop the motor, and to return the carriage to a default position;

wherein the motor controller is configured to execute a routine, the routine comprising:

(1) switching on and initializing a program, and setting all port parameters of the motor controller and set registers;

(2) executing a watchdog program;

(3) if a 10 millisecond flag exists, executing a timing and cumulating subprogram to finish carriage direction changing and to realize motor ceasing for 1 second cumulation, LED lamp glittering for 0.5 second cumulation and routine performing for 15 minutes cumulation;

(4) if the 10 millisecond flag does not exist, and if a 1 millisecond flag exists, executing a key and LED lamp scanning subprogram to obtain a routine key selected by a user on-line;

(5) if the 10 millisecond flag and the 1 millisecond flag do not exist, and if a 250 millisecond flag exists, executing a routine-switch scanning subprogram to obtain a routine key selected by the user on-line;

(6) if the 10 millisecond flag, the 1 millisecond flag and the 250 millisecond flag do not exist, and if a 3 millisecond flag exists, executing a motor rolling and kneading control subprogram to control the motor to rotate forward until the state of the current upper motor switch is changed or to control the motor to rotate backward until the state of the current lower motor switch is changed;

(7) if the 10 millisecond flag, the 1 millisecond flag, the 250 millisecond flag and the 3 millisecond flag do not exist, and the carriage is returned to the default position, executing a carriage resetting subprogram to prepare for the next motor rolling and kneading control; and (8) if the 10 millisecond flag, the 1 millisecond flag, the 250 millisecond flag and the 3 millisecond flag do not exist, and the carriage is not returned to the default position, clearing a T-1S register and adding one to a value of a T-60S register; and (9) ending the routine and returning to the step (1) if the value of the T-60S register equals to 60, and returning to the step (1) directly if the value of the T-60S register does not equal to 60.

9. The control system of claim 8 further comprising a timer configured to receive an input from the user, set a time interval according to the user's input, and start counting down from the time interval when the motor controller starts the motor.

10. The control system of claim 9, wherein the motor controller is further configured to, after starting the motor, stop the motor in response to the user's deactivating the on-off switch or when the timer counts down to zero.

11. The control system of claim 10, wherein the motor controller is further configured to, after stopping the motor, return the carriage to the default position.

12. The control system of claim 8, wherein the plurality of operating modes further includes a demonstration mode.

13. The control system of claim 8, wherein the motor controller comprises a plurality of relay switches, wherein each of the plurality of relay switches corresponds to a respective operating mode and is activated when the corresponding operating mode is selected.

14. A method of operating a massage device, the massage device having a base, a carriage movably engaged with the base, a plurality of kneading heads mounted on the carriage, and a motor operative to drive the plurality of kneading heads to produce a kneading effect on a body of a user and to drive the carriage up and down relative to the base such that various areas of the body can be massaged, the method comprising the steps of:

(a) setting the massage device in one of a plurality of operating modes in response to a user's selection, the plurality of operating modes includes at least two of:
(i) full range massage;
(ii) upper portion massage;
(iii) lower portion massage; and
(iv) demonstration mode;

(b) starting the motor by a motor controller in response to the user's activating an on-off switch to drive the plurality of kneading heads and to drive the carriage up and down relative to the base in a range according to the operating mode selected by the user;

(c) stopping the motor in response to the user's deactivating the on-off switch; and (d) returning the carriage to a default position;

wherein the motor controller is configured to execute a routine, the routine comprising:

(1) switching on and initializing a program, and setting all port parameters of the motor controller and set registers;

(2) executing a watchdog program;

(3) if a 10 millisecond flag exists, executing a timing and cumulating subprogram to finish carriage direction changing and to realize motor ceasing for 1 second cumulation, LED lamp glittering for 0.5 second cumulation and routine performing for 15 minutes cumulation;

(4) if the 10 millisecond flag does not exist, and if a 1 millisecond flag exists, executing a key and LED lamp scanning subprogram to obtain a routine key selected by a user on-line;

(5) if the 10 millisecond flag and the 1 millisecond flag do not exist, and if a 250 millisecond flag exists, executing a routine-switch scanning subprogram to obtain a routine key selected by the user on-line;

(6) if the 10 millisecond flag, the 1 millisecond flag and the 250 millisecond flag do not exist, and if a 3 millisecond flag exists, executing a motor rolling and kneading control subprogram to control the motor to rotate forward until the state of the current upper motor switch is changed or to control the motor to rotate backward until the state of the current lower motor switch is changed;

(7) if the 10 millisecond flag, the 1 millisecond flag, the 250 millisecond flag and the 3 millisecond flag do not exist, and the carriage is returned to the default position, executing a carriage resetting subprogram to prepare for the next motor rolling and kneading control; and (8) if the 10 millisecond flag, the 1 millisecond flag, the 250 millisecond flag and the 3 millisecond flag do not exist, and the carriage is not returned to the default position, clearing a T-1S register and adding one to a value of a T-60S register; and (9) ending the routine and returning to the step (1) if the value of the T-60S register equals to 60, and returning to the step (1) directly if the value of the T-60S register does not equal to 60.

15. The method of claim 14, wherein the upper portion massage includes shoulder and upper back massage, and the lower portion massage includes lower back and waist massage.

16. The method of claim 14 further comprising the steps of:

(a) before the starting step, setting a timer for a time interval in response to the user's input;

(b) concurrent to the starting step, starting the timer to count down from the time interval; and (c) after the starting step, stopping the motor when the timer counts down to zero.

17. The method of claim 14 further comprising the steps of, after the starting step, repeating the setting step if the user has reselected a new operating mode that is different from the operating mode previously selected by the user, and operating the motor to drive the carriage up and down relative to the base in a range according to the new operating mode.

* * * * *